United States Patent Office 3,271,464
Patented Sept. 6, 1966

3,271,464
SELECTIVE DEHYDRATION OF SECONDARY ALCOHOL OVER 5-A SIEVE
James Richard Hays and Arthur Homer Neal, Baton Rouge, La., assignors to Esso Research and Engineering Company, a corporation of Delaware
No Drawing. Filed June 19, 1961, Ser. No. 117,826
6 Claims. (Cl. 260—643)

The present invention relates to a process for the selective dehydration of secondary alcohols to olefins in the presence of primary alcohols. More particularly this invention relates to obtaining said selective dehydration by passing the mixture of alcohols over a 5-A molecular sieve at elevated temperatures. Yet more particularly, in a preferred embodiment, this invention relates to recovering primary alcohols from a mixture of primary and secondary alcohols by selectively dehydrating the secondary alcohols to form molefins and then separating the olefins formed by extraction or distillation. Most particularly, in a preferred embodiment, this invention relates to separating the about 15–30% of secondary alcohols unavoidably formed in the telomerization of ethylene with methanol or trimethyl borate from the desired primary alcohols by this process.

According to the present invention it has now been surprisingly discovered that extremely selective dehydration of secondary alcohols from primary alcohols may be obtained particularly by utilizing a 5-A molecular sieve catalyst under preferred reaction conditions. Thus, selectivities expressed as the ratio of secondary to primary alcohols destroyed of better than 65 to 1 were obtained. It was further found that conventional dehydration catalysts such as activated alumina failed to give high selectivities.

The present process is particularly attractive for use in processes wherein synthetic alcohols are produced by telomerization. In this process the product comprises a mixture of primary and secondary alcohols which vary in chain length from a few carbon atoms to 25 carbon atoms or more together with smaller amounts of hydrocarbons. The valuable products are, of course, the primary alcohols. Since the separation of primary from secondary alcohols by distillation, solvent extraction or other known means is extremely difficult (because of the overlapping of boiling points and solubilities of the components of the telometer product), the present process satisfies a real need.

The mixtures of alcohols which may be selectively treated according to the present process are mixtures of $C_1$–$C_{30}$ primary and $C_3$–$C_{30}$ secondary saturated monoalcohols. These alkanols include both straight and branched chain alcohols. Examples of these alcohols are methanol, ethanol, normal propanol, isopropanol, normal butanol, isobutanol, the appropriate pentanols, heptanols, hexanols, octanols, decanols, hendecanols, dodecanols, tridecanols, eicosanols, etc. Additionally, and preferably, mixtures of these alcohols of wide boiling range may be treated to dehydrate the secondary alcohols. However, since somewhat different conditions are used depending upon the molecular weight of the alcohols to be dehydrated, higher selectivities in the dehydration of secondary alcohols from primary alcohols are obtained where the primary and secondary alcohols are of a narrower molecular weight range. Where tertiary alcohols are present with the primary and secondary alcohols, these alcohols will also be dehydrated by the present process.

Particularly attractive feed stocks for dehydration are the telomer alcohol products obtained by telomerizing methanol or trimethyl borate with a $C_2$–$C_5$ olefin, preferably ethylene, in the presence of a free radical initiator. Processes for preparing these alcohols are described, for example, in U.S. 2,668,181. Additionally, other methods for preparing telomer alcohols may be utilized to prepare an alcohol feed stock for the present process. Typical compositions of telomer product alcohols may be $C_3$–$C_{25}$ alcohols, containing 15–50 wt. percent, e.g. 25 wt. percent secondary alcohols, 1–5 wt. percent e.g. 2 wt. percent tertiary alcohols, 10–25 wt. percent, e.g. 15 wt. percent hydrocarbon.

The 5-A molecular sieve catalysts used in the present dehydration process are certain natural or synthetic zeolites or alumino-silicates, such as a calcium alumino-silicate. These catalysts exhibit the properties of a molecular sieve adsorbent in that they are made up of porous crystals wherein the pores of crystals are of molecular dimension and are of substantially uniform size. These materials may be described at water-containing aluminosilicates having the formula $(R,R'_2)O.Al_2O_3.nSiO_3.mH_2O$, wherein R may be an alkaline earth metal such as calcium, strontium or barium or even magnesium and wherein R′ is an alkali metal such as sodium or potassium or lithium. Generally the above-described materials, when treated for the removal of substantially all of the water therefrom, retain their crystal structure and are particularly suitable as selective adsorbents for certain types of compounds, such as adsorbents for the selective adsorption of straight chain hydrocarbons to the substantial exclusion of non-straight chain hydrocarbons.

A particularly suitable solid adsorbent for straight chain hydrocarbons, and suitable for use in the practice of this invention, is a calcium alumino-silicate, apparently actually a sodium calcium alumino-silicate commercially available and referred to in this specification as Type 5A Molecular Sieve. The crystals of this particular calcium alumino-silicate have a pore size or opening of about 5 Angstrom units, sufficiently large to admit straight chain hydrocarbons, such as the normal paraffins and the normal olefins, to the substantial exclusion of the non-straight chain hydrocarbons. This particular selective adsorbent is available in various sizes, e.g. in the form of ⅛ or 1/16″ diameter pellets or as a finely divided powder having a particle size in the range of 0.5–5.0 microns.

Broad reaction conditions for the present process are as follows: temperatures 250 to 650° F., preferably 400 to 500° F., e.g. 450° F.; space velocities 5 to 20 v./v./hr., preferably 8 to 12 v./v./hr., e.g. 10 v./v./hr. (Vol. alcohol/vol. 5-A sieve/hr.) Pressures in this process are not critical but for economy atmospheric pressure is preferred. The sieve may ordinarily be regenerated after extended periods of operation by burning with air at temperatures of 700° F. and higher by conventional techniques.

The preferred conditions for recovering primary alcohols from a mixture of primary and secondary alcohols involves passing the vapors of the alcohol mixture over 5-A molecular sieve at 8 to 12 v./v./hr., e.g. 10 v./v./hr., liquid feed rate at a temperature of 410–465° F., e.g. 435° F., for alcohols through nonanol. For higher alcohols the temperature should be between 45 and 90° F., e.g. 65° F., above the boiling point of the highest boiling alcohol.

In a preferred embodiment the entire smear of alcohols from telomerization boiling between 350° F., and 550° F. and consisting essentially of $C_7$ to $C_{15}$ alcohols is dehydrated to remove secondary alcohols at 550 to 600° F., e.g. 575° F., and space velocities of 8 to 12 v./v./hr., e.g. 10 v./v./hr.

Preferred methods of separation of the olefins from the wide boiling dehydration product alcohols is to dissolve the dehydration products in methanol or dimethyl formamide and extract the resulting solution with heptane, pentane, $C_4$–$C_{10}$ paraffins or other light aliphatic hydrocarbons. The extraction is carried out at temperatures of less than 150° F., preferably at <25° F., and may be carried out in a continuous countercurrent manner.

The present invention will be more clearly understood from a consideration of the following example.

*Example*

Dehydration was conducted on a 20% octanol-2 in octanol-1 feed at a reaction temperature of 225° C. and atmospheric pressure as follows:

| Vol. Alcohol/Vol. 5-A Sieve/Hour | Percent Alcohol Destroyed | | Ratio of Secondary to Primary Destroyed |
|---|---|---|---|
| | Primary | Secondary | |
| 5 | 14 | 93 | 6.6 |
| 10 | 1 | 68 | 68 |
| 20 | 0 | 0 | 0 |

Activated alumina, a typical dehydration catalyst, showed no dehydration activity at these conditions. It can thus be seen that a reaction temperature of 225° C. and 10 v./v./hr. are, for example, explicit conditions for extremely high selectivity.

It is to be understood that this invention is not limited to the specific example, which has been offered merely as an illustration, and that modifications may be made without departing from the spirit of this invention.

What is claimed is:

1. A process for selectively dehydrating secondary alcohols to olefins in the presence of primary alcohols which comprises contacting a mixture of alkanols selected from the group consisting of linear and methyl-branched $C_1$–$C_{30}$ primary and $C_3$–$C_{30}$ secondary alkanols with a crystalline alumino-silicate having a pore size of about 5 A. units molecular sieve at temperatures in the range of 250 to 650° F. and utilizing liquid space velocities of 8 to 12 volumes of alcohol/volume of molecular sieve/hour.

2. The process of claim 1 in which the mixture of primary and secondary alcohols is a $C_3$–$C_{30}$ mixture of alcohols from telomerization of ethylene with methanol.

3. The process of claim 1 in which the mixture of primary and secondary alcohols consists of 10 to 40 wt. percent secondary alcohols, 40 to 80 wt. percent of primary alcohols and small amounts of hydrocarbons.

4. The process of claim 1 in which a narrow cut of primary and secondary alcohols is contacted with the molecular sieves, and olefins are separated from the dehydration reaction products by distillation to obtain an olefin-free purified primary alcohol.

5. The process of claim 1 in which the olefins are separated from the dehydration reaction products by extraction.

6. The process of claim 5 in which extraction is with a $C_4$–$C_{10}$ paraffin.

References Cited by the Examiner

UNITED STATES PATENTS

| | | | |
|---|---|---|---|
| 2,377,026 | 10/1940 | Miller | 260—682 |
| 2,859,256 | 11/1958 | Hess et al. | 260—643 X |
| 2,882,243 | 4/1959 | Milton | 260—643 X |
| 3,033,778 | 5/1962 | Frilette | 260—682 |
| 3,140,322 | 7/1964 | Frilette et al. | 260—667 |

LEON ZITVER, *Primary Examiner.*

M. S. JAROSZ, M. B. ROBERTO, J. E. EVANS,
*Assistant Examiners.*